G. R. FORSTER.
CURRENT COLLECTOR.
APPLICATION FILED JUNE 15, 1908.
939,995.
Patented Nov. 16, 1909.
2 SHEETS—SHEET 2.
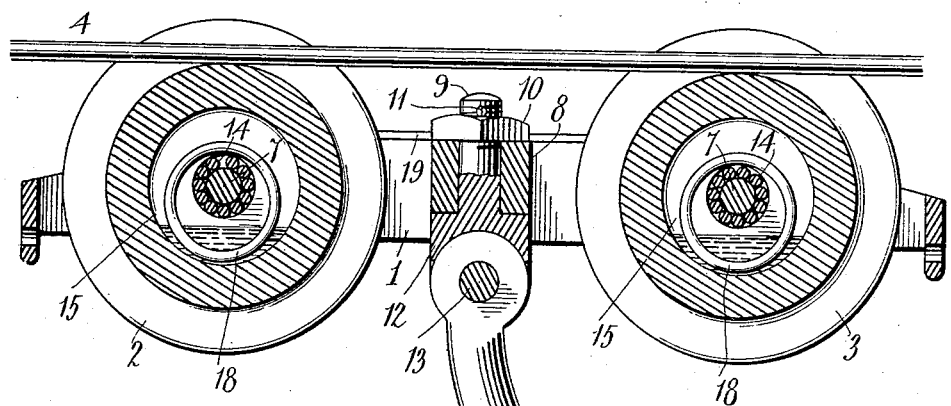
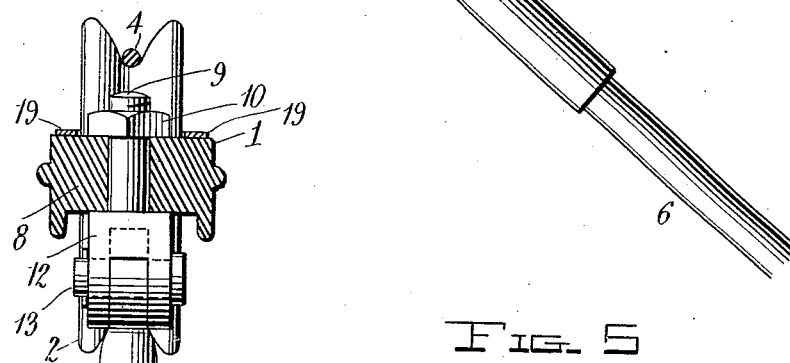
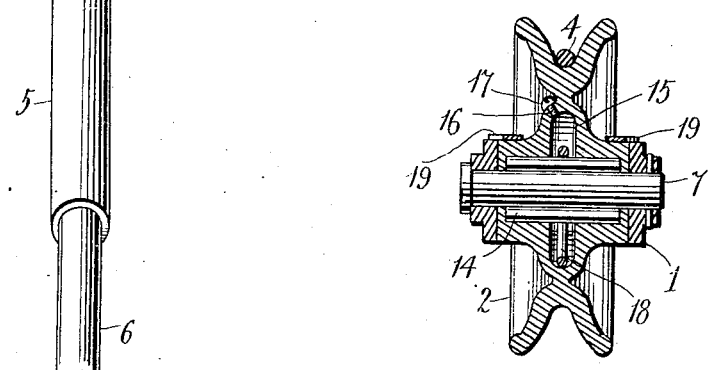
Inventor
George R. Forster
By
Attorneys
Witnesses

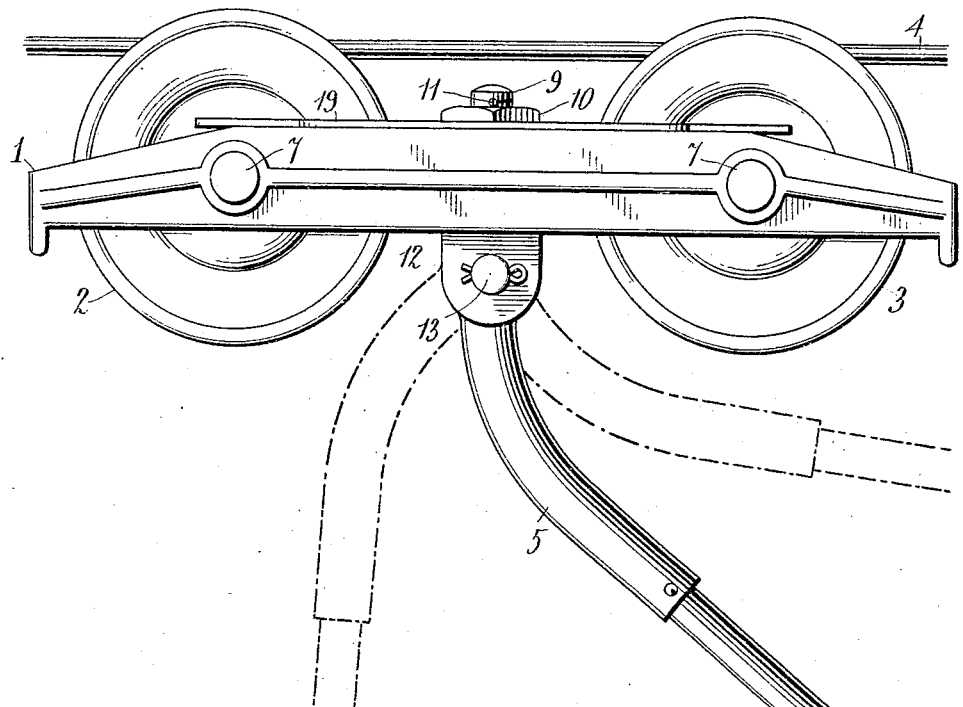
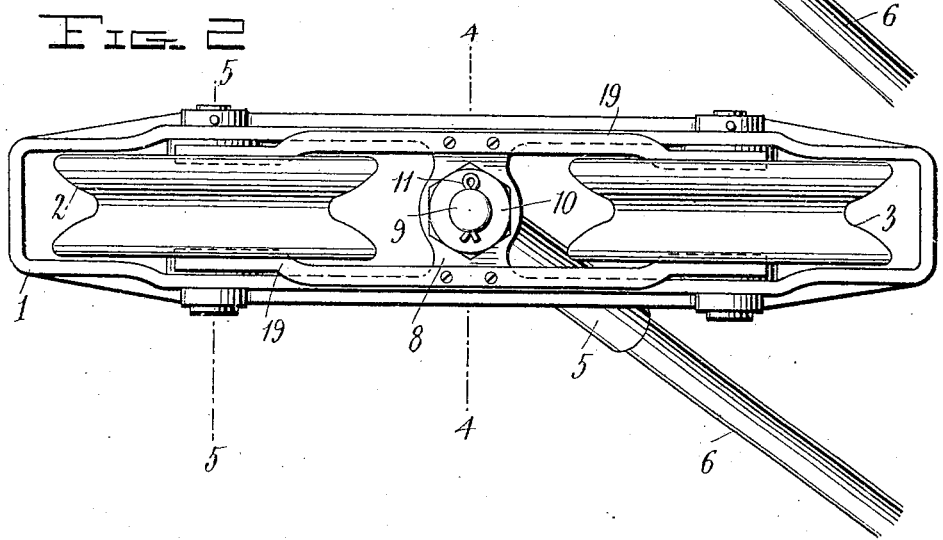

UNITED STATES PATENT OFFICE.

GEORGE R. FORSTER, OF FITHIAN, ILLINOIS.

CURRENT-COLLECTOR.

939,995.

Specification of Letters Patent. Patented Nov. 16, 1909.

Application filed June 15, 1908. Serial No. 438,585.

*To all whom it may concern:*

Be it known that I, GEORGE R. FORSTER, a citizen of the United States, residing at Fithian, in the county of Vermilion, State of Illinois, have invented certain new and useful Improvements in Current-Collectors; and I do hereby declare the following to be a full, clear, and exact description of the invention, such as will enable others skilled in the art to which it appertains to make and use the same.

The present invention relates to improvements in current-collectors for trolleys, and it has for its principal object the provision of an exceedingly simple, inexpensive, and efficient device of that nature so constructed as to possess the maximum freedom of action, to lessen the possibility of the wheels leaving the wire, and to cause the wheels to follow the wire precisely and with a minimum of lateral movement.

To this end, the invention resides in the provision of a harp connected to the pole in such a manner as to permit of its movement in both vertical and horizontal planes, or, in other words, to follow the wire irrespective of the angle of the trolley pole with reference to the same.

The invention further resides to a considerable extent in the particular construction of the trolley wheels, each of which latter is mounted upon a series of anti-friction bearings and is provided with an interiorly-located oil-chamber having disposed therein an oil ring which loosely embraces the bearings for the wheel and projects into the body of oil within the chamber, thus continuously lubricating the bearings.

The preferred embodiment of the invention is illustrated in the accompanying drawings, in which corresponding parts, or features, as the case may be, are designated by the same reference numerals throughout the several views.

Of the said drawings, Figure 1 is a side elevation of the complete invention. Fig. 2 is a plan view thereof. Fig. 3 is a section taken longitudinally through Fig. 2. Figs. 4 and 5 are transverse sections taken respectively, on the lines 4—4 and 5—5 of the same figure.

Referring more particularly to the drawings, 1 designates, generally, the harp; 2 and 3 the front and rear trolley wheels which are carried by the harp, as hereinafter described, and run along the under surface of the trolley wire 4; and 5 the eye-bolt by means of which the harp is connected to the trolley pole 6. The harp, as shown in Fig. 2 is in the form of a skeleton oblong frame, the side members of which are provided toward their opposite ends with pairs of alining openings through which pass the pins 7 upon which the trolley wheels are rotatably mounted. These pins are held against displacement in any preferred manner. The sides of the harp are further connected by a centrally-located transverse bridge 8 which is formed integral therewith and is provided with a central vertical opening for the reception of the stem portion of a bolt 9 which is rotatably fitted therein, the threaded upper end of the stem carrying a lock nut 10 and having engaged therewith a split key 11. The projecting lower end of the bolt 9 is formed with a pair of spaced ears 12 provided with alining perforations for the reception of a pivot pin 13 which is passed therethrough and through the eye portion of the bolt 5, which latter, as shown, is curved downward and has its lower end riveted to the pole 6. It will thus be apparent that the harp is capable of pivotal movement in both a horizontal and a vertical plane, so as to precisely follow the wire with which its trolley wheels are engaged, irrespective of the angle of the trolley pole. It will likewise be apparent that owing to the bent formation of the eye-bolt 5, the latter will not be brought into contact with either wheel, so as to interfere with the movements thereof when the pole assumes the positions indicated by the dotted lines in Fig. 1.

Each of the wheels carried by the harp is provided with an axial opening through which the corresponding bearing pin 7 passes, the diameter of the pins being sufficiently less than that of the openings in question to permit of the interposition of a series of anti-friction rollers 14 between each pin and the peripheral wall of the opening through which it passes. Each wheel is further provided with an interiorly-located lubricant chamber 15 which is likewise arranged axially thereof and communicates with the above-mentioned bearing opening, the diameter of which latter is approximately half that of the chamber. Each chamber is filled with oil or other lubricant through an inlet opening 16 formed through one of the walls of the wheel and closed by a threaded plug 17. The lubricant contained within said chamber is supplied continuously to the bearing pins 7 and the rollers which surround the same by means of rings 18 which are suspended loosely from said pins and extend into the lubricant, as shown in Fig. 3. These rings may be made of leather, or, if preferred, may be in the form of small coil springs. Owing to the provision of the roller bearings, the wheels will rotate with the greatest possible ease even when the car is traveling at an extremely high speed, this effect being furthered by the lubrication of the pin and the bearings, to which the oil is supplied by the rings.

The hub portions of the two trolley-wheels are preferably connected by means of brushes 19 in the form of flat strips of spring brass, said brushes being disposed longitudinally of the harp, and having their ends resting on the hubs, as shown in Fig. 2. The end members of the harp extend a slight distance below the lower edges of the sides and are provided with openings through which the upper ends of the ropes (not shown) for lowering the pole are passed, the ropes being made fast to said end members in any desired manner.

What is claimed is:

1. The combination, with a harp and a bearing pin carried thereby, of a trolley-wheel rotatably mounted upon said pin and provided with an interiorly-located lubricant chamber arranged axially thereof; a series of anti-friction rollers located interiorly of the wheel and surrounding said pin; and a ring disposed within said chamber and suspended from said rollers, said ring extending into the lubricant contained in said chamber for supplying the same to said pin and said rollers.

2. The combination with a trolley pole, of a harp pivotally connected with the pole for movement in both vertical and horizontal planes; a pair of bearing pins carried by the harp; a trolley wheel rotatably mounted upon each pin and provided with an interiorly located lubricant chamber arranged axially thereof; a series of anti-friction rollers located interiorly of each wheel and surrounding the pin upon which the latter is mounted; and a ring suspended from each series of rollers and extending into the lubricant contained in the adjacent chamber for supplying the same to the rollers and the pins.

3. The combination of a harp consisting of an oblong skeleton frame provided with a central transverse bridge having a vertical opening formed therethrough; a bolt rotatably fitted in said opening and provided with a pair of spaced depending ears; a downwardly bowed eye bolt having its eye portion fitting in the space between said ears and pivoted to the latter; a trolley pole to which the lower end of said eye bolt is attached; a pair of bearing pins carried by the harp; a trolley wheel rotatably mounted upon each pin and provided with an interiorly located lubricant chamber arranged axially thereof; a series of anti-friction rollers located interiorly of each wheel and surrounding the pin upon which the latter is mounted; and a ring suspended from each series of rollers and extending into the lubricant contained in the adjacent chamber for supplying the same to the rollers and the pins.

In testimony whereof, I affix my signature, in presence of two witnesses.

GEORGE R. FORSTER.

Witnesses:
O. B. WYSONG,
B. F. MEADE.